United States Patent
Pahk et al.

(10) Patent No.: US 7,308,130 B2
(45) Date of Patent: Dec. 11, 2007

(54) METHOD FOR INSPECTING INPUT SHAFT OF POWER STEERING SYSTEM

(75) Inventors: Heui-Jae Pahk, Seoul (KR); Moon-Tae Hwang, Seoul (KR); Jin-Ki Kim, Seoul (KR)

(73) Assignee: SNU Precision Co., Ltd., Seoul (KR)

( * ) Notice: Subject to any disclaimer, the term of this patent is extended or adjusted under 35 U.S.C. 154(b) by 425 days.

(21) Appl. No.: 10/497,070

(22) PCT Filed: Nov. 30, 2002

(86) PCT No.: PCT/KR02/02255

§ 371 (c)(1),
(2), (4) Date: May 28, 2004

(87) PCT Pub. No.: WO03/058164

PCT Pub. Date: Jul. 17, 2003

(65) Prior Publication Data

US 2005/0000051 A1    Jan. 6, 2005

(30) Foreign Application Priority Data

Nov. 30, 2001    (KR) ............... 10-2001-0075360

(51) Int. Cl.
*G06K 9/46*    (2006.01)

(52) U.S. Cl. ........................... 382/152; 134/21

(58) Field of Classification Search .............. 15/301, 15/303, 309.2, 316.1, 345; 382/152; 134/21
See application file for complete search history.

(56) References Cited

U.S. PATENT DOCUMENTS

| | | | | |
|---|---|---|---|---|
| 4,325,161 A * | 4/1982 | Wood et al. | ................ | 15/316.1 |
| 4,759,074 A * | 7/1988 | Iadipaolo et al. | ............ | 382/152 |
| 5,265,298 A * | 11/1993 | Young | ......................... | 15/345 |
| 5,661,872 A * | 9/1997 | Meyer et al. | ............... | 15/316.1 |
| 5,806,138 A * | 9/1998 | Kawasaki | ..................... | 15/345 |
| 6,870,953 B2 * | 3/2005 | Suzuki et al. | ............... | 382/152 |

FOREIGN PATENT DOCUMENTS

JP    01015234    1/1989

* cited by examiner

*Primary Examiner*—Theresa T. Snider
(74) *Attorney, Agent, or Firm*—Lowe Hauptman Ham & Berner (57) ABSTRACT

Provided is a machine and a method for inspecting an input shaft of a power system. First an second cameras take a photograph of first and second champer of the input shaft from directions perpendicular to the chamfers to capture image data of the chamfers. The input shaft is rotated by an indexing drive until overlapping a central line of first and second chamfers of an input shaft on a standard line of image array coordinate system of a computer. Then, widths of the first and second chamfers of the input shaft is calculated. Thereafter, the indexing drive rotates the input shaft by predetermined degrees. The computer processes image data of another first and second chamfers captured by the first and second cameras and calculates widths of the another first and second chamfers. Continuously, widths of remaining chamfers of the input shaft are calculated.

3 Claims, 11 Drawing Sheets

FIG. 1

(Prior Art)

FIG. 2

(Prior Art)

FIG. 11b great*ly according to measuring errors inherent to the respective inspectors.

METHOD FOR INSPECTING INPUT SHAFT OF POWER STEERING SYSTEM

TECHNICAL FIELD

The present invention relates to a machine and method for inspecting an input shaft for use in a power steering system of an automobile, wherein the machining precision of the input shaft for use in the power steering system can be accurately inspected.

BACKGROUND ART

As is well known in the art, the power steering system of an automobile is an apparatus for supplying steering oil to a power cylinder cooperating with the steering system by an oil pump driven by engine power so as to facilitate operating a steering wheel. The power steering system is designed in such a manner that large hydraulic pressure is produced when parking or driving a car at a low speed, whereas small hydraulic pressure is produced therein to secure safety when driving a car at a high speed.

Figure 1:
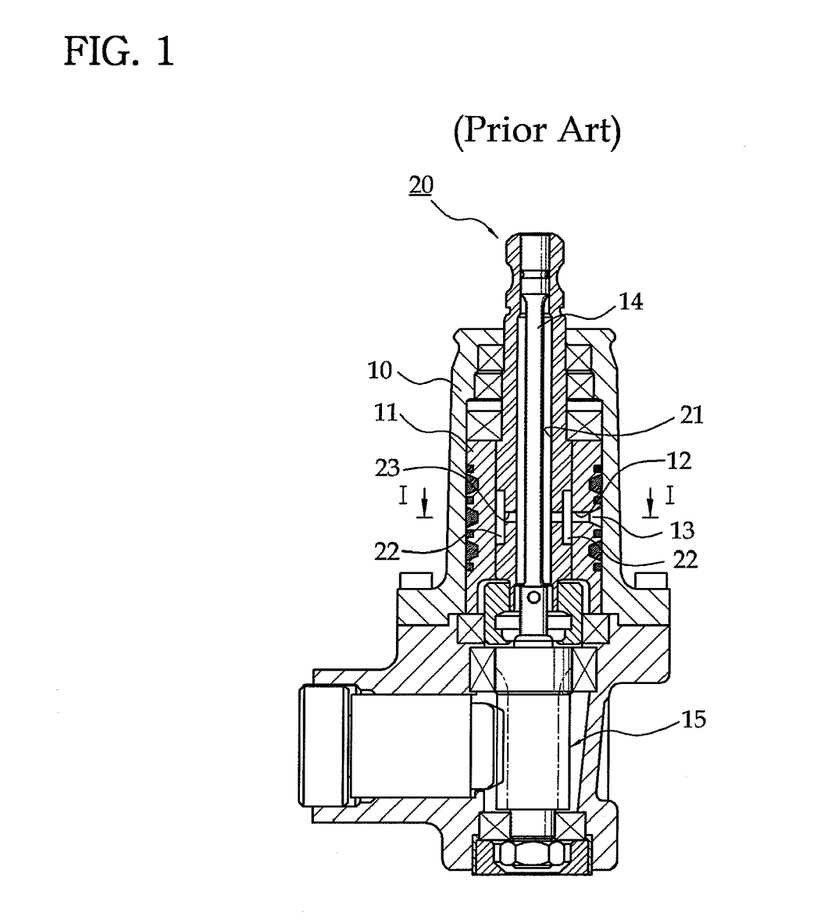
FIG. 1 is a sectional view illustrating an example of an input shaft for use in a general power steering system.

An example of such a power steering system will be described with reference to FIGS. 1 and 2. Referring to these figures, a valve body 11 is mounted within a valve housing 10, and a port 12 and an oil groove 13 forming an oil passage for steering oil are formed on the outer surface of the valve body 11 so that they communicate with each other. An input shaft 20, which is connected to a steering column and rotated in response to the operation of the steering wheel, is mounted on the inner side of the valve body 11. A bore 21 is formed at the center of the input shaft 20, and a plurality of slots 22 are circunmferentially formed on the exterior of the input shaft 20 at equal intervals. Ports 23, which communicate with the port 12 of the valve body 11 to become the oil passage for the steering oil, are formed in the slots 22 of the input shaft 20, respectively. Further, a torsion bar 14 is mounted in the bore 21 of the input shaft 20 and is connected to a gear unit 15.

In the meantime, when a driver operates the steering wheel, the input shaft 20 connected to the steering column is rotated in response to the operating direction of the steering column so as to control the oil passage for the steering oil. Accordingly, the operation of the power cylinder is controlled, and thus, the steering of the car is performed. However, a shock is generated due to the sudden variation in and disturbance of flow of the steering oil which passes at high speed and pressure through the port 12 of the valve body 11 and the ports 23 of the input shaft 20 when the direction of rotation of the input shaft 20 is changed, while another shock is generated due to physical friction between the input shaft 20 and the steering oil. These shocks become sources of noise and vibration. Further, wear on the valve body 11 and the input shaft 20 is produced, and thus, the life of valve body 11 and the input shaft 20 is shortened. Accordingly, some problems involved with a reduction in reliability may be produced.

In order to reduce the hydrodynamic and mechanical shock produced in response to a change in the direction of the input shaft 20, the surface of the input shaft 20 should be precisely machined. Moreover, right and left ends of the slots 22 are chamfered so as to reduce fluid resistance exerted thereon. Chamfered faces at the right and left ends of the slots 22, i.e. chamfers 24 specifically shown in FIG. 2, become elements which greatly influence the reduction of fluid resistance. Thus, the chamfers 24 are precisely machined by using an edge-grinding machine.

In general, the machining precision of the chamfers of the input shaft for use in power steering systems is performed by means of a sampling inspection through a visual inspection of an inspector. However, visual inspections that relied entirely upon the determination of the inspector may vary greatly according to measuring errors inherent to the respective inspectors. Thus, there is a problem in that time and manpower are greatly consumed. In particular, the sampling inspection is involved with a problem in that reliability for all the input shafts cannot be completely guaranteed. Therefore, a total inspection for the input shafts is required. However, a machine for correctly and rapidly performing a total inspection for input shafts has not yet been developed and thus the total inspection of input shafts cannot be performed using the prior art.

DISCLOSURE OF INVENTION

The present invention is conceived to solve the aforementioned problems in the prior art. An object of the present invention is to provide a machine and method for inspecting an input shaft for use in a power steering system, wherein the machining precision of the input shaft of the power steering system can be accurately inspected.

Another object of the present invention is to provide a machine and method for inspecting an input shaft for use in a power steering system, wherein a total inspection for input shafts can be rapidly and accurately made by automating a series of inspection processes such as the feeding, cleaning, sorting, and discharge of the input shafts.

A further object of the present invention is to provide a machine and method for inspecting an input shaft for use in a power steering system, wherein data on inspection results for the input shaft can be processed and managed in real time.

According to an aspect of the present invention for achieving the objects, there is provided a machine for inspecting an input shaft for use in a power steering system, which has a plurality of slots formed at equal intervals in a circumferential direction thereof and first and second chamfers formed at left and right sides of the slots. The machine of the present invention comprises a frame on which cleaning and inspecting positions of the input shaft are provided; a cleaning means installed at the cleaning position on the frame for cleaning the input shaft, an indexing drive installed at the inspecting position on the frame for causing the input shaft to be stepwise rotated; first and second cameras for photographing the first and second chamfers of the input shaft, which is rotated by the indexing drive, in a direction normal to each of the first and second chamfers and outputting image data of the chamfers, respectively; first and second illumination means for illuminating the first and second chamfers of the input shaft coaxially with optical axes of the first and second cameras, respectively; and a computer for processing the image data outputted from the first and second cameras by means of a computer program.

According to another aspect of the present invention, there is also provided a method for inspecting an input shaft for use in a power steering system, which has a plurality of slots formed at equal intervals in a circumferential direction thereof and first and second chamfers formed at left and right sides of the slots. The method of the present invention comprises the steps of cleaning foreign substances adhering to the input shaft by means of a cleaning means installed at a cleaning position; loading the input shaft from the cleaning position into an inspecting position; causing first and second cameras to photograph the first chamfer in an initial slot and the second chamfer in another slot of the input shaft, which is loaded at the inspecting position, in a direction normal to each of the first and second chamfers to acquire image data of the first and second chamfers, respectively; processing the respective image data of the first and second cameras by means of a computer program and overlapping a central line between left and right edge lines of the first or second chamfer with a standard line of an image array coordinate system; calculating distances between the left and right edge lines of the first and second chamfers in an overlapped state and then calculating width values of the first and second chamfers; calculating width values of all remaining first and second chamfers while stepwise rotating the input shaft repeatedly by a predetermined angle; and determining whether the input shaft is superior or inferior based on the calculated width values of the first and second chamfers.

BEST MODE FOR CARRYING OUT THE INVENTION

Hereinafter, a preferred embodiment of a machine and method for inspecting an input shaft for use in a power steering system according to the present invention will be described in detail with reference to the accompanying drawings.

Figure 2:
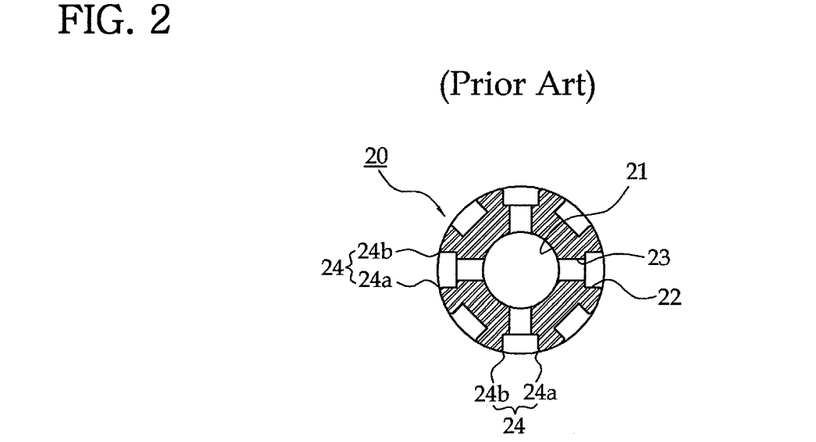
FIG. 2 is a sectional view taken along line I-I in FIG. 1.
Figure 3:
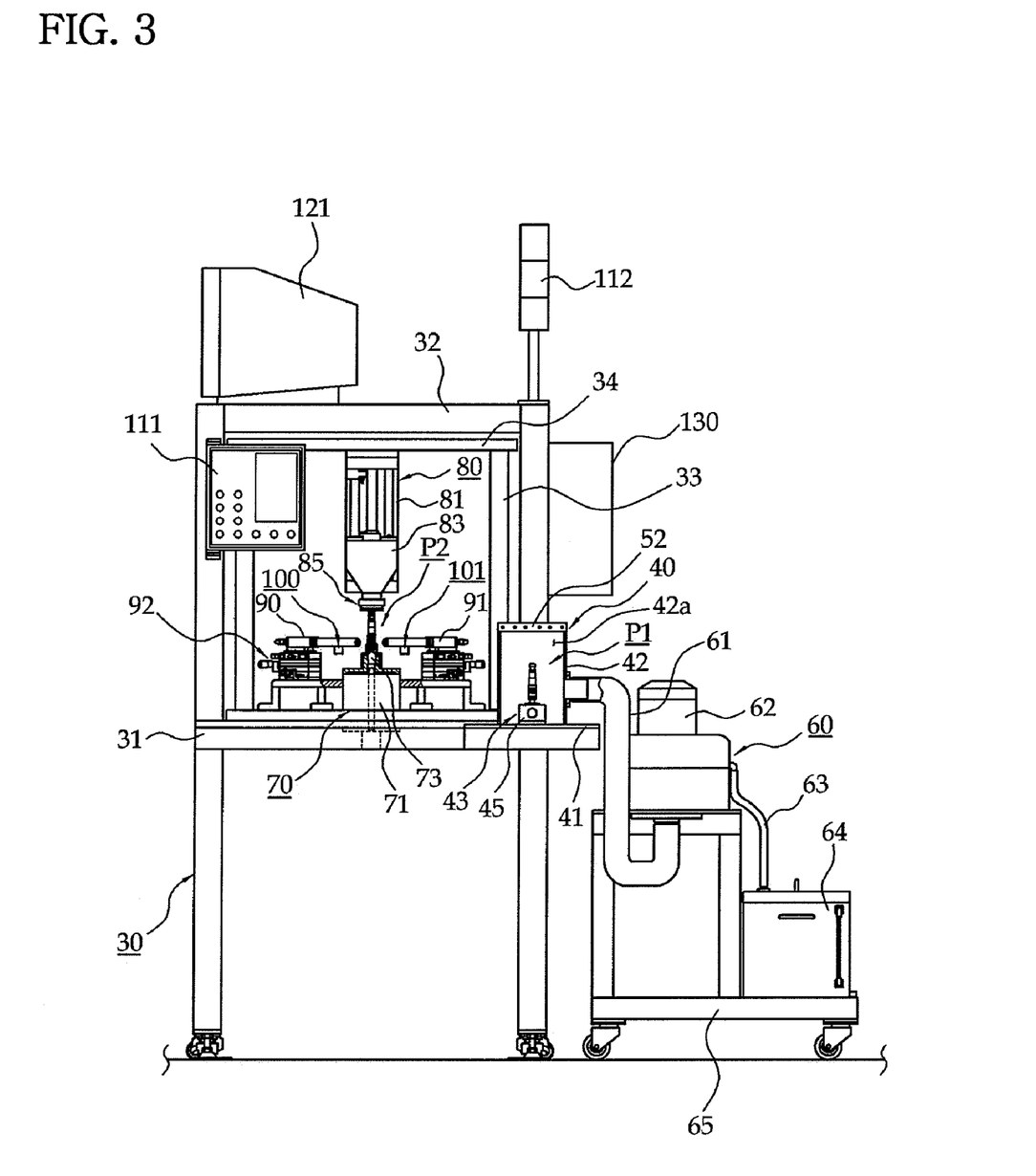
FIG. 3 is a front view showing a configuration of a machine for inspecting the input shaft according to the present invention.

Referring first to FIGS. 2 and 3, the machine for inspecting an input shaft 20 according to the present invention is arranged in series with a well-known edge-grinding machine for machining chamfers 24 of the input shaft 20. A frame 30 constituting the main body of the machine comprises a worktable 31 on which a cleaning position P1 and an inspecting position P2 of the input shaft 20 are provided, and an overhead frame 32 installed above the worktable 31. A mounting plate 34 is supported by posts 33 and installed below the overhead frame 32. FIG. 3 shows that the cleaning position P1 is on the left side of the worktable 31 whereas the inspecting position P2 is in the middle of the worktable 31 and the overhead frame 32. However, this is a simple example, and the cleaning and inspecting positions P1 and P2 may be changed to any other positions suitable for loading and unloading the input shaft 20.

As shown in FIG. 2, the input shaft 20 to be inspected by the inspecting machine of the present invention includes eight slots 22 formed of an equal width at an equal interval of 45 degrees along a circumferential direction of the input shaft 20, and sixteen chamfers 24 formed at right and left ends of the slots 22. The input shaft 20 that has been completely subjected to the machining process by an edge grinding machine is loaded onto the cleaning position P1 and then onto the inspecting position P2 by means of an operation of a robot. The loaded input shaft 20 is located upright and then cleaned and inspected at the cleaning and inspecting positions P1 and P3, respectively.

Referring to FIGS. 3, 4, 6 and 7, the machine for inspecting the input shaft according to the present invention includes a cleaning device 40 installed at the cleaning position P1 of the worktable 31 for cleaning foreign substances such as chips, oil and dust from the surface of the input shaft 20. The cleaning device 40 comprises a base plate 41 installed at the cleaning position P1 of the worktable 31, a booth 42 which is installed onto the base plate 41 to form a purge room 42a for surrounding the cleaning position P1 and includes an entrance 42b for allowing the input shaft 20 to be loaded into the purge room 42a, and a loading unit 43 for loading and unloading the input shaft 20 through the entrance 42b of the booth 42. The loading unit 43 includes a carriage 44 for loading and transporting the input shaft 20, an air cylinder 45 having a cylinder rod 45a for moving the carriage 44, and a linear motion guide 46 for guiding the motion of the carriage 44 in a linear motion. The linear motion guide 46 includes a guide rail 46a installed on the top surface of the worktable 31, and a slide 46b installed on the bottom surface of the carriage 44 so that it can be slid along the guide rail 46a.

In addition, on the top surface of the carriage 44 is installed a rotary unit 47 that is supported for allowing the lower end of the input shaft 20 to be rotated. The rotary unit 47 includes a bearing housing 47a fixed to the top surface of the carriage 44, a center 47c that is rotationally mounted to the bearing housing 47a through a bearing 47b and supports the lower end of the input shaft 20, and a cap 47d for covering the bearing housing 47a. Air nozzles 51 of an air blower 50 are installed within the booth 42 so as to remove foreign substances from the input shaft 20 by blowing air and simultaneously allowing the input shaft 20 to be rotated. Although it has been illustrated in FIGS. 6 and 7 that four air nozzles 51 of the air blower 50 are mounted to allow the input shaft 20 to be rotated in a clockwise direction on the figures, the positions and number of the air nozzles can be changed. Further, in the embodiment of the present invention, the air blower 50 may become a hot air blower for blowing hot air to remove oil from the surface of the input shaft 20.

Figure 6:
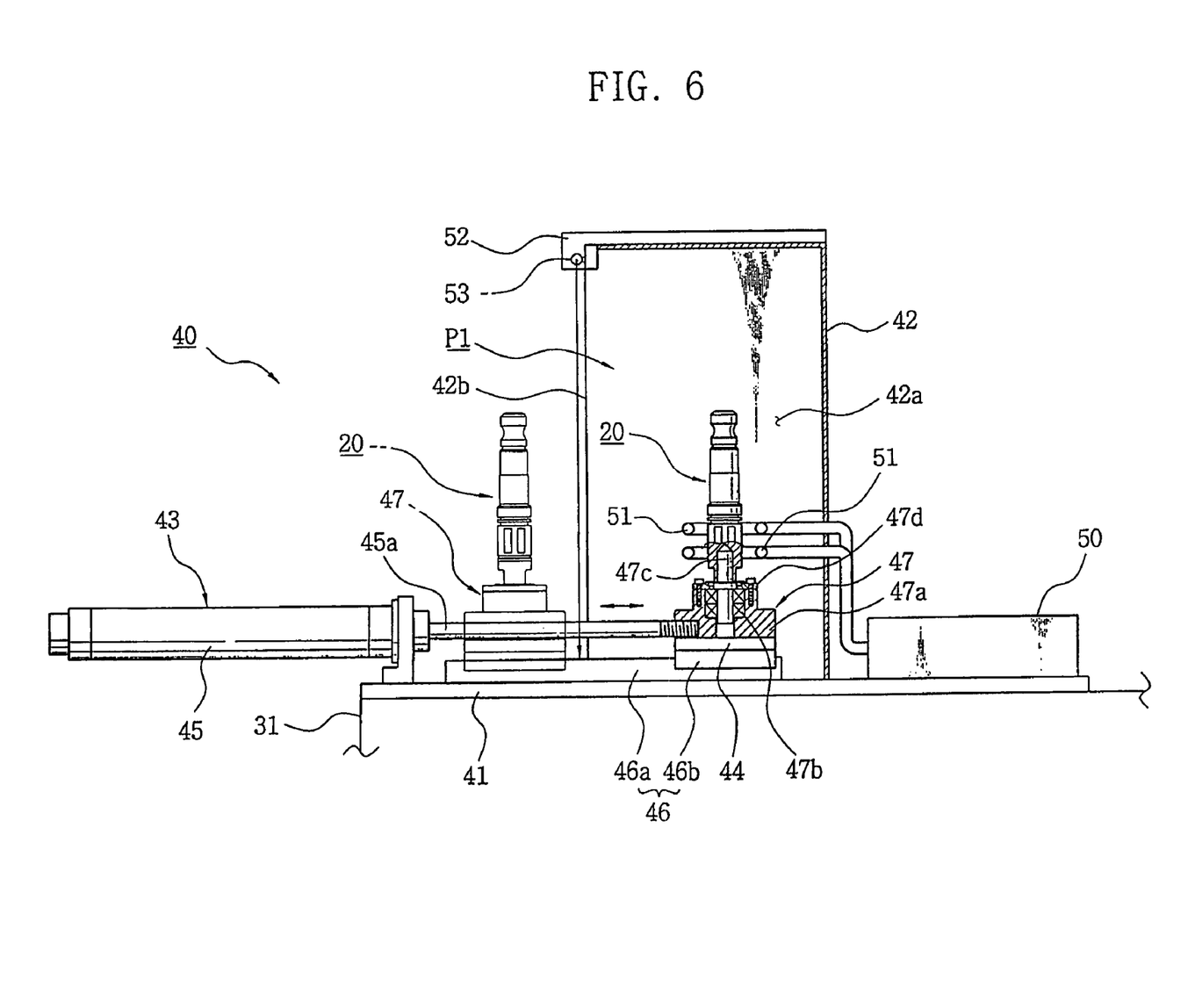
FIG. 6 is a side sectional view showing the configuration of a cleaning device according to the present invention.
Figure 7:
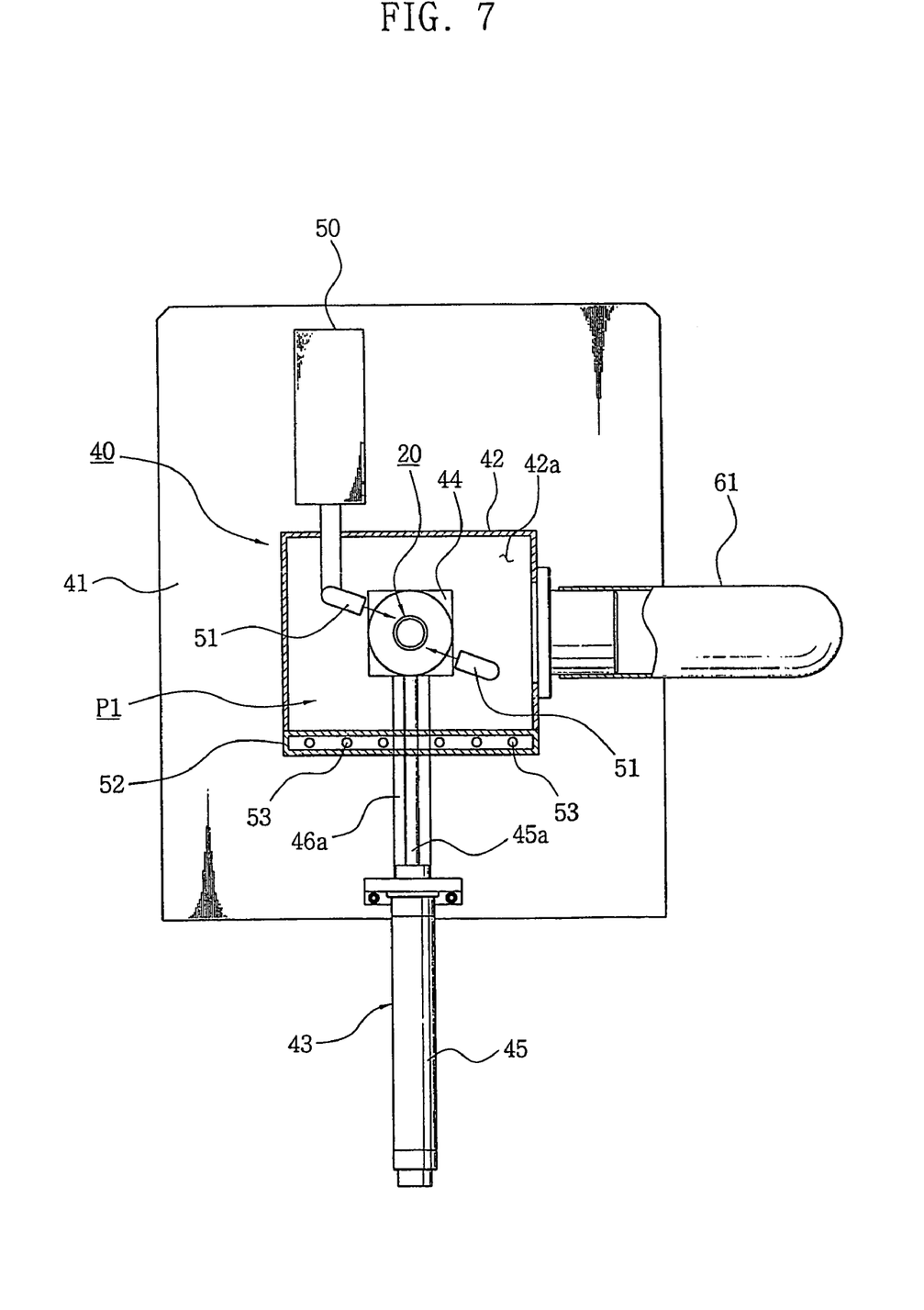
FIG. 7 is a plan sectional view showing the configuration of the cleaning device according to the present invention.
Figure 8:
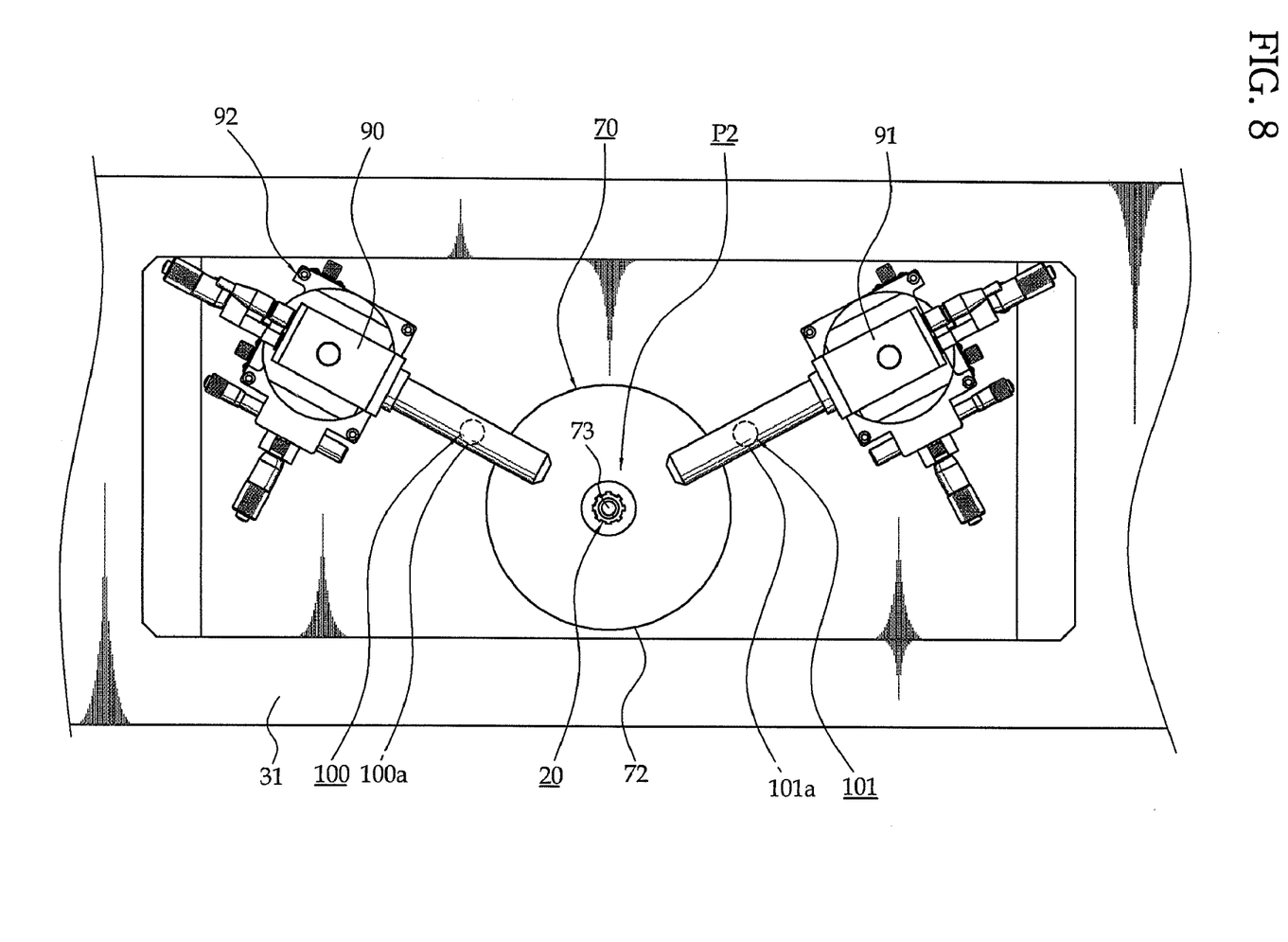
FIG. 8 is a plan view showing configurations of the first and second cameras and the first and second illumination devices according to the present invention.

An air duct 52 for forming an air curtain is formed on the upper side of the booth 42 in order to prevent the foreign substances from being scattered through the entrance 42b. The air duct 52 includes a plurality of air nozzles 53 for blowing air toward the entrance 42b of the booth 42. The air cylinder 45 and the air duct 52 in the cleaning device 40 are connected to an air supply for supplying air thereto. The air supply may comprise an air compressor and an air controller for controlling the supply of air at predetermined pressure.

A dust collector 60 for collecting the foreign substances removed from the input shaft 20 through air suction is connected to the purge room 42*a* of the booth 42. The dust collector 60 includes a suction unit 62 connected to the purge room 42*a* of the booth 42 via a suction tube 61, and a dust-collecting tank 64 connected to a discharge tube 63 of the suction unit 62. The suction unit 62 and the dust-collecting tank 64 of the dust collector 60 are loaded in a freely movable cart 65.

Figure 4:
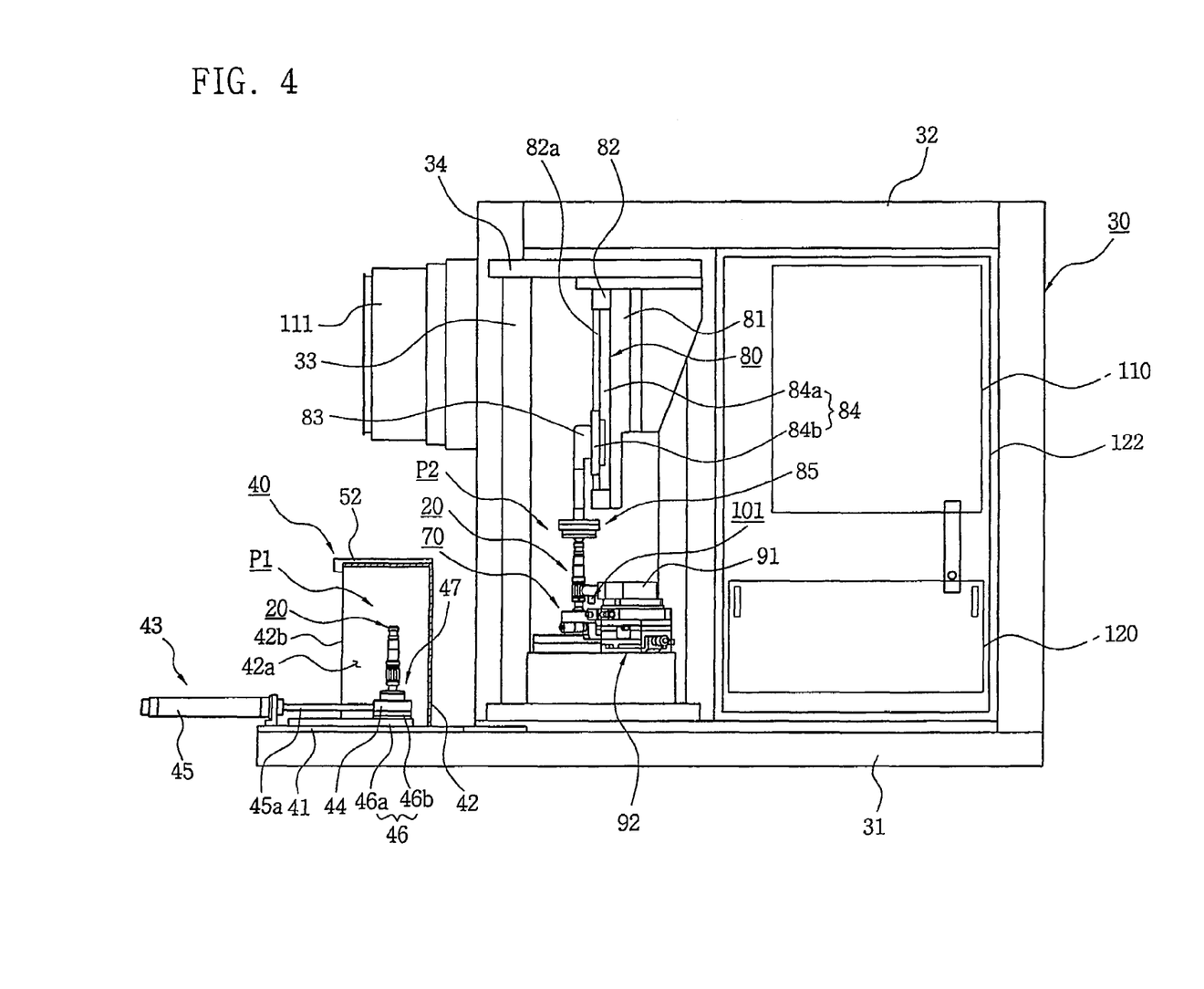
FIG. 4 is a side view showing a configuration of a portion of the machine for inspecting the input shaft according to the present invention.
Figure 5:
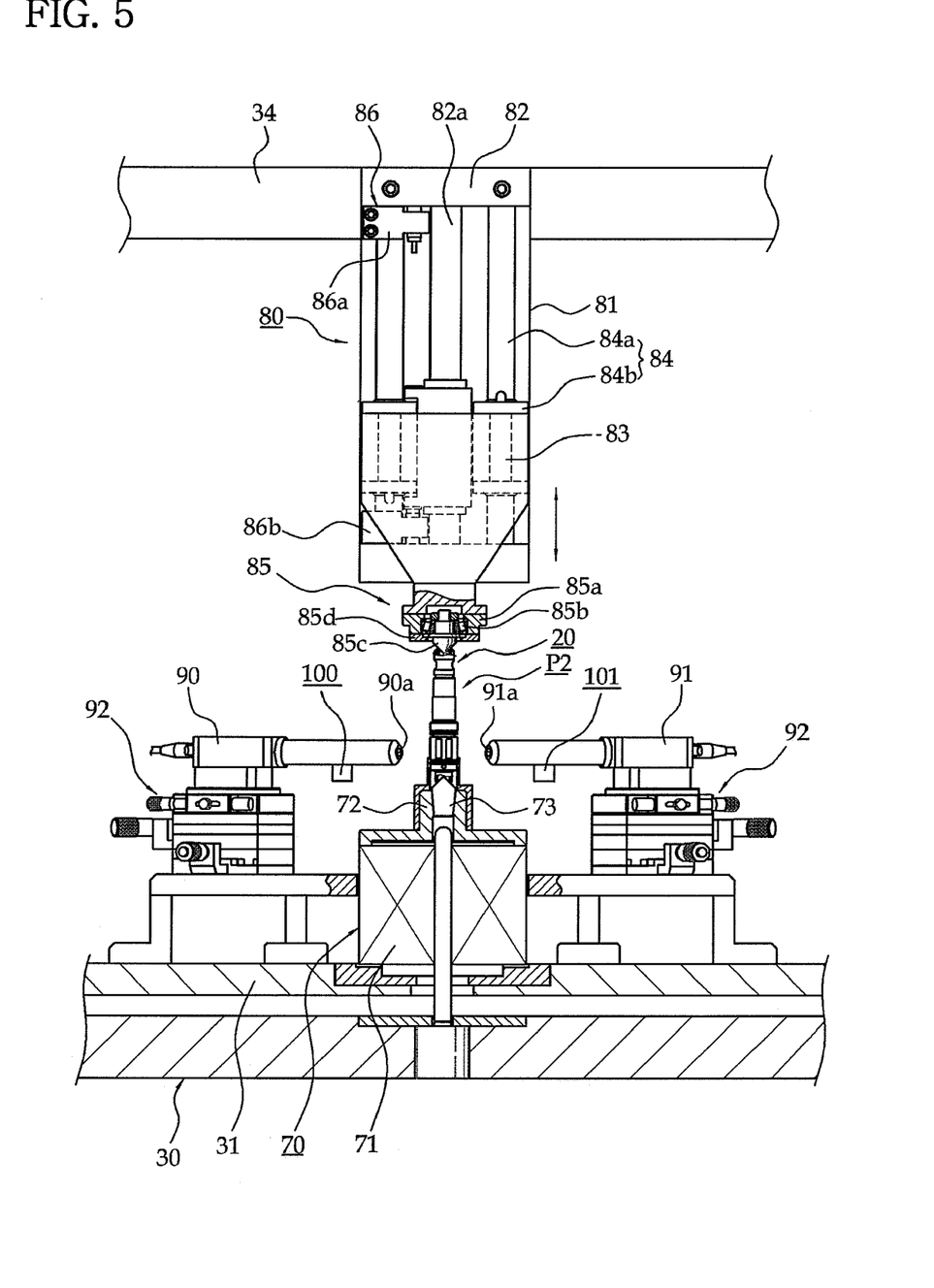
FIG. 5 is a front view showing configurations of an indexing drive, a tailstock, first and second cameras, and first and second illumination devices according to the present invention.

Referring to FIGS. 3-5, at the inspecting position P2 of the frame 30 is installed a driving device for the stepwise rotation of the upright input shaft 20 by a predetermined angle. The driving device includes an indexing drive 70 installed on the top surface of the worktable 31, and a tailstock 80 installed below the mounting plate 34 to be aligned with the indexing drive 70 and movable vertically with respect to the input shaft 20 to rotationally support the input shaft 20 in cooperation with the indexing drive 70.

The indexing drive 70 comprises a servomotor 71 for providing a driving force capable of causing the input shaft 20 to be rotated stepwise by a predetermined angle, an air chuck 72 mounted to rotate by means of the driving of the servomotor 71, and a lower center 73 detachably chucked to the air chuck 72 for supporting the lower end of the input shaft 20.

As specifically shown in FIG. 5, the tailstock 80 comprises a base plate 81 fixed vertically to the bottom surface of the mounting plate 34, an air cylinder 82 with a cylinder rod 82*a* which is mounted in front of the base plate 81, a lifter 83 fixed to the cylinder rod 82*a* of the air cylinder 82, and a linear motion guide 84 for guiding the motion of the lifter 83 generated by the air cylinder 82 into a linear motion. The linear motion guide 84 comprises a pair of guide rails 84*a* mounted vertically in parallel with and in front of the base plate 81, and a pair of slides 84*b* mounted below the lifter 83 to be slid along the guide rails 84*a*. A rotary unit 85 is mounted on the lower end of the lifter 83. The rotary unit 85 comprises a bearing housing 85*a* fixed to the lower end of the lifter 83, an upper center 85*c* that is rotationally mounted to the bearing housing 85*a* through a bearing 85*b* and supports the upper end of the input shaft 20, and a cap 85*d* for covering the bearing housing 85*a*. The upward and downward motion of the lifter 83 is sensed and controlled by means of a sensing unit 86. The sensing unit 86 comprises an upper limit sensor 86*a* for sensing the highest position of the lifter 83 and a lower limit sensor 86*b* for sensing the lowest position of the lifter 83.

Referring to FIGS. 3, 5, 8 and 9, the machine for inspecting the input shaft according to the present invention, comprises first and second cameras 90 and 91 for photographing the chamfers 24 of the input shaft 20 standing upright at the inspecting position P2 of the frame 30 and outputting image data thereof, and first and second illumination devices 100 and 101 for allowing the first and second cameras 90 and 91 to easily capture images of the chamfers 24 by illuminating the chamfers 24 so that the first and second cameras 90 and 91 can photograph the chamfers 24 of the input shaft 20. The first and second cameras 90 and 91 are arranged to be normal to the chamfers 24 of the input shaft 20. The first camera 90 takes a photograph of a first chamfer 24*a* of any one slot 23, whereas the second camera 91 takes a photograph of a second chamfer 24*b* thereof. In the preferred embodiment of the present invention, the first and second cameras 90 and 91 are CCD cameras (charge coupled device cameras) with 640×480 pixels. The first and second cameras 90 and 91 are loaded onto a movement stage 92, which in turn finely adjusts the positions of the first and second cameras 90 and 91. The constitution and operation of the movement stage 92 are generally known in the art, and thus, detailed descriptions thereof will be omitted herein. The first and second illumination devices 100 and 101 illuminate the chamfers 24 of the input shaft 20 coaxially with optical axes of the first and second cameras 90 and 91 and cause the images of the chamfers 24 to be projected onto the first and second cameras 90 and 91.

Figure 9:
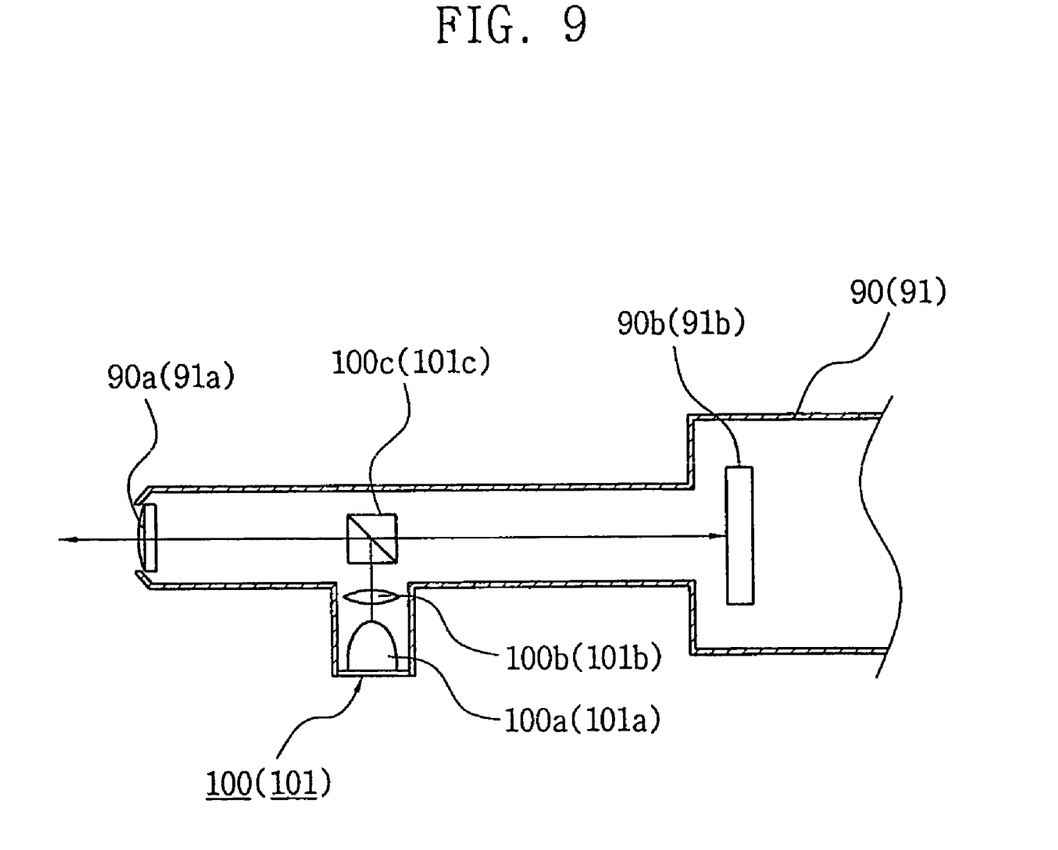
FIG. 9 is a view schematically showing the configurations of the first and second illumination devices according to the present invention.

As shown in FIG. 9, the first and second illumination devices 100 and 101 comprise LEDs (light emitting diodes) 100*a* and 101*a* that serve as light sources and are arranged to be orthogonal to the optical axes of the first and second cameras 90 and 91, collimators 100*b* and 101*b* for converting light emitted from the LEDs 100*a* and 100*b* into parallel light flux, and beam splitters 100*c* and 101*c* for applying the parallel light flux emerging from the collimators 100*b* and 101*b* to the chamfers 24 of the input shaft 20 through object lenses 90*a* and 91*a* of the first and second cameras 90 and 91 and for projecting the images of the chamfers 24 incident from the object lenses 90*a* and 91*a* of the first and second cameras 90 and 91 onto CCD image sensors 90*b* and 91*b* of the first and second cameras 90 and 91, respectively.

Referring again to FIGS. 3 and 4, the machine for inspecting the input shaft according to the present invention further includes a controller 110 for controlling the operations of the cleaning device 40, the air blower 50, the dust collector 60, the indexing drive 70, the tailstock 80, the first and second cameras 90 and 91, and the first and second illumination devices 100 and 101. The controller 110 is installed on the overhead frame 32 of the frame 30 and provided with a control panel 111 on the front surface of the controller 110. The inspector may set functions needed for controlling the machine when inspecting the input shaft by manipulating or operating the control panel 111. The controller 110 visually indicates the operating state of the machine for inspecting the input shaft via a warning lamp 112 mounted onto the top surface of the overhead frame 32.

In addition, the image data of the input shaft 20 outputted from the first and second cameras 90 and 91 are inputted into a computer 120 in real time. The computer 120 is equipped with a microprocessor, a monitor 121, an output device such as a printer, and an input device such as a keyboard. The computer 120 processes the image data of the input shaft 20 inputted from the first and second cameras 90 and 91 by means of a program, displays the processed image data onto the monitor 121, and classifies the input shafts into superior and inferior ones. The computer 120 interfaces with the controller 110 and the robot for the purpose of controlling the machine for inspecting the input shaft according to the present invention. Further, the controller 110 and the computer 120 are received within a case 122 installed on the worktable 31 of the frame 30. An air conditioner 130 for controlling the temperature in the inspecting position P2 at a predetermined level is installed on the posts 33 of the frame 30. A change of temperature in the inspecting position P2 can be prevented through temperature control performed by the air conditioner 130, and accordingly, the inspection environment within the inspecting position P2 can be maintained constant. Thus, the reliability of image data of the input shaft 20 acquired from the first and second cameras 90 and 91 can be enhanced.

Hereinafter, a method for inspecting the input shaft using the machine for inspecting the input shaft for use in power steering systems according to the present invention will be explained with reference to FIGS. 11*a* and 11*b*.

Figure 11A:
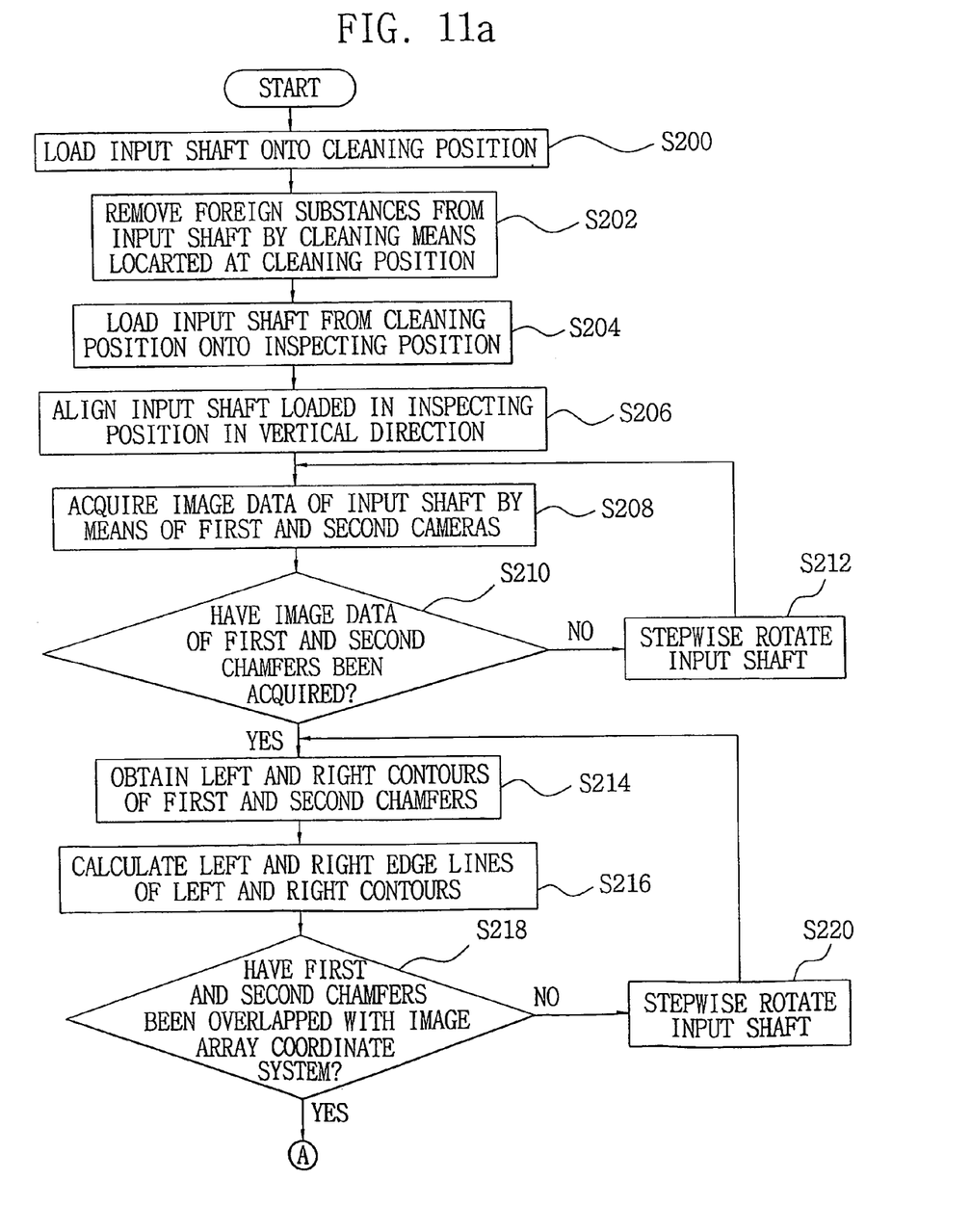
FIGS. 11a and 11b are flowcharts illustrating a method for inspecting the input shaft according to the present invention.
Figure 11B:
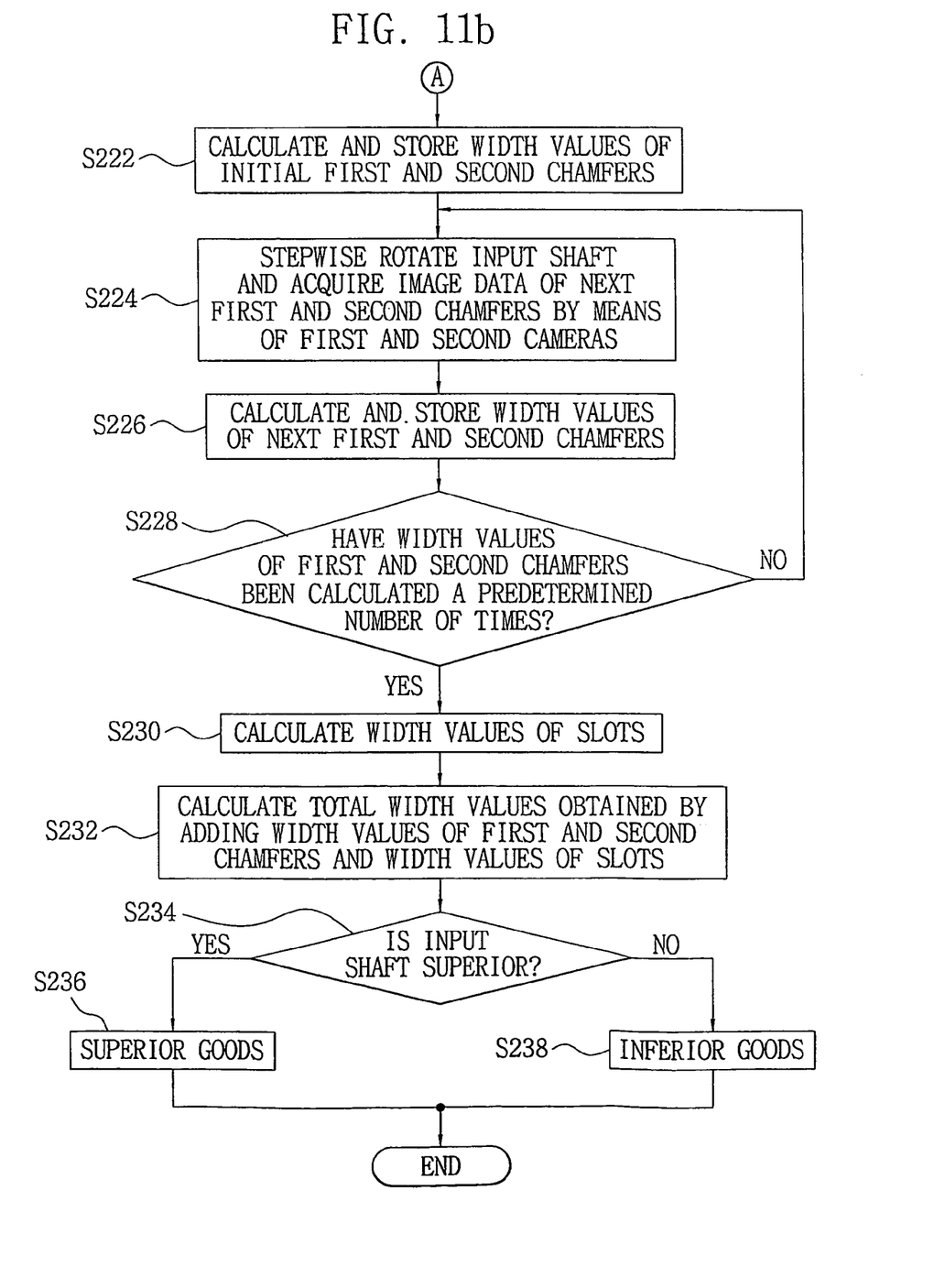

Referring again to FIGS. 3 and 7 together with FIGS. 11*a* and 11*b*, while the input shaft inspection machine is on standby, the carriage 44 of the cleaning device 40 is positioned outside the booth 42 with the input shaft 20 not loaded thereon, and the lifter 83 of the tailstock 80 is raised. The robot conveys the input shaft 20 from the edge grinding machine to the inspection machine according to the present invention in such a manner that the lower end of the input shaft 20 with the slots 22 and the chamfers 24 formed therein is aligned in line with the center 47c of the rotary unit 47. After the input shaft 20 is supported at the center 47c of the rotary unit 47, the air cylinder 45 actuates to advance the cylinder rod 45a. Accordingly, the carriage 44 is caused to move linearly by means of the linear motion guide 46 and is moved into the purge room 42a, i.e. the cleaning position P1, through the entrance 42b of the booth 42. The air cylinder 45 stops operating, and the loading process for the input shaft 20 is then completed (S200).

Next, the air blown through the air nozzles 51 of the air blower 50 removes foreign substances from the contaminated surface of the input shaft 20 (S202). At this time, a rotational moment is imparted to the input shaft 20 by means of force of the air blown through the air nozzles 51 of the air blower 50, and the center 47c for supporting the input shaft 20 can be rotated via the bearing 47b of the rotary unit 47. Thus, since the input shaft 20 and the center 47c can be rotated together, foreign substances on the entire surface of the input shaft 20 can be completely removed. As a result, when the first and second cameras 90 and 91 photograph the chamfers 24 of the input shaft 20 to capture image data of the chamfers 24, any errors resulting from the foreign substances can also be avoided. The air supplied to air duct 52 by means of the air supply is blown to the entrance 42a of the booth 42 through the air nozzles 53, and thus, an air curtain is formed around the entrance 42a. The foreign substances removed from the surface of the input shaft 20 cannot pass through the entrance 42a of the booth 42 by means of the air curtain. Therefore, the inspection machine, including the first and second cameras 90 and 91 located near the inspecting position P2, can be prevented from being contaminated.

Further, the suction unit 62 of the dust collector 60 is actuated at the same time the air blower 50 of the cleaning device 40 cleans the input shaft 20. The suction unit 62 sucks in air containing foreign substances from the purge room 42a of the booth 42 through the suction tube 61 and then pumps the air into the dust-collecting tank 64 through the discharge tube 63. In the dust-collecting tank 64, the foreign substances are filtered from the air using a filter and collected therein, whereas the air is discharged to the outside. After the cleaning of the input shaft 20 has been completed, the air cylinder 45 is actuated to move back the cylinder rod 45a. Then, the carriage 44 is caused to move linearly by means of the linear motion guide 46 and is again moved to the initial position through the entrance 42b of the booth 42.

Referring to FIG. 5, the robot picks up the input shaft 20 supported by the center 47c of the rotary unit 47 and then loads the input shaft 20 in such a manner that the lower end of the input shaft is aligned with the lower center 73 of the indexing drive 70 (S204). After the input shaft 20 is supported by the lower center 73 of the indexing drive 70, the air cylinder 82 of the tailstock 80 is actuated to advance the cylinder rod 82a. Accordingly, the lifter 83 is caused to move linearly and downwardly by means of the linear motion guide 84. Due to the lowering of the lifter 83, the upper center 85c of the rotary unit 85 is aligned with the upper end of the input shaft 20 and supports the input shaft 20. The input shaft 20 is vertically aligned at the inspecting position P2 by means of the lower center 73 of the indexing drive 70 and the upper center 85c of the tailstock 80 (S206). The robot that completes loading the input shaft 20 into the inspecting position P2 conveys the following input shaft 20 from the edge-grinding machine to the cleaning position P1 and performs the cleaning of the input shaft 20.

The first and second illumination devices 100 and 101 illuminate the input shaft 20 that is loaded in the inspecting position P2 of the worktable 31 coaxially with the optical axes of the first hand second cameras 90 and 91 and also project the images of the chamfers 24 of the input shaft 20 onto the first and second cameras 90 and 91 which in turn photograph the input shaft 20 and output the image data thereof, respectively (S208). At this time, as shown in FIG. 9, the light emitted from the LEDs 100a and 101a of the first and second illumination devices 100 and 101 is irradiated onto the input shaft 20 through the collimators 100b and 101b, the beam splitters 100c and 101c, and the object lenses 90a and 91a of the first and second cameras 90 and 91, respectively. Then, the images of the chamfers 24 of the input shaft 20 are projected onto and photographed by the CCD image sensors 90b and 91b via the object lenses 90a and 91a of the first and second cameras 90 and 91, and the beam splitters 100c and 101c, respectively. The first camera 90 takes a photograph of the first chamfer 24a of any one slot 22 of the input shaft 20 in a direction normal to the longitudinal direction of the input shaft and outputs the relevant image data, whereas the second camera 91 photographs the second chamfer 24b of the other slot 22 of the input shaft 20 in a direction normal to the longitudinal direction of the input shaft and outputs the relevant image data. The image data of the first and second chamfers 24a and 24b of the input shaft 20, which are outputted from the first and second cameras 90 and 91, respectively, are inputted into the computer 120 in real time.

When it is determined that the image data of the first and second chamfers 24a and 24b have not been inputted into the computer 120 from the first and second cameras 90 and 91, the computer 120 causes the servomotor 71 to actuate and the input shaft 20 to be stepwise rotated by a predetermined angle, e.g. 3 degrees, in response to the output of control signals (S212). Then, it goes into the above step S208. Thereafter, it is again determined whether the image data of the first and second chamfers 24a and 24b have been inputted into the computer 120 by means of the first and second cameras 90 and 91, respectively. The image data of the first and second chamfers 24a and 24b can also be acquired through the repetitive execution of steps S208 to S212.

Figure 10A:
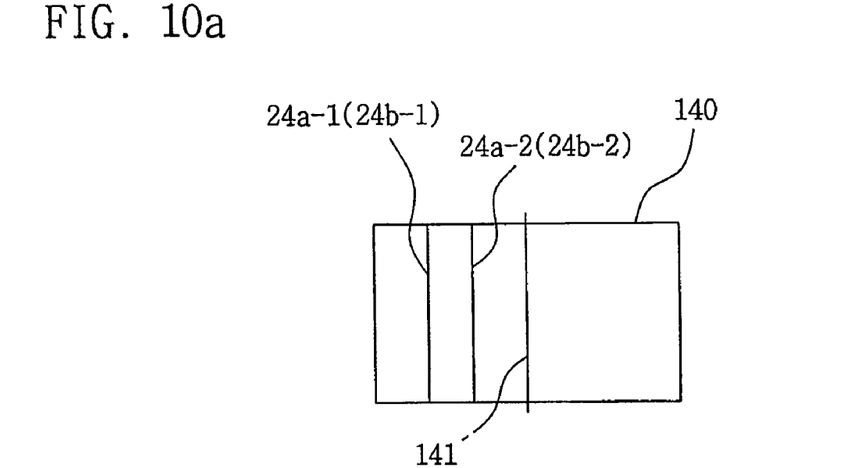
FIGS. 10a-10c are views showing the operation of overlapping right and left edge lines of the first and second chamfers with an image array coordinate system according to the present invention.
Figure 10B:
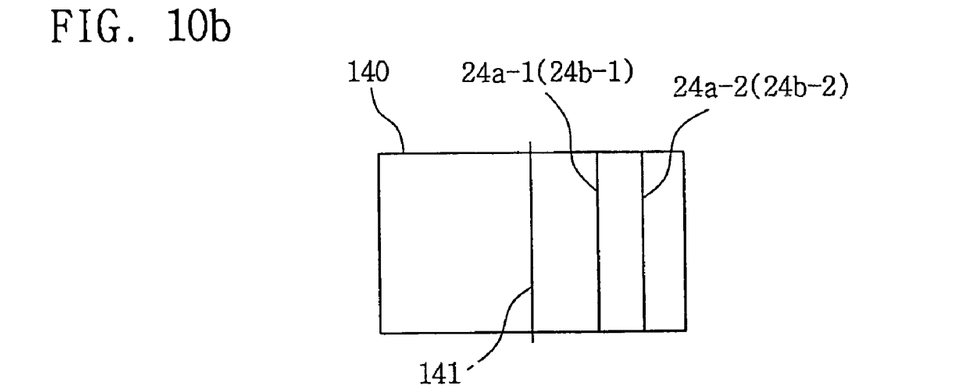

If the image data of the first and second chamfers 24a and 24b are acquired through the execution of the above processes, the computer 120 causes a gray level image of any one of the first and second chamfers 24a and 24b, e.g. the first chamfer 24a, to be binary coded by means of a threshold and obtains left and right contours from the binary image of the first chamfer 24a (S214). Next, through the least square error method, relevant noise is filtered out to obtain linear equations of the left and right contours, and left and right edge lines 24a-1 and 24a-2 are calculated (S216). The computer 120 displays the left and right edgelines 24a-1 and 24a-2 of the first chamfer 24a onto the monitor 121 and determines whether a central line between the left and right edge lines 24a-1 and 24a-2 overlaps with a standard line 141 of an image array coordinate system 140 (S218). FIGS. 10a and 10b show that the central line of the left and right edge lines deviates from the standard line 141 of the image array coordinate system 140.

Figure 10C:
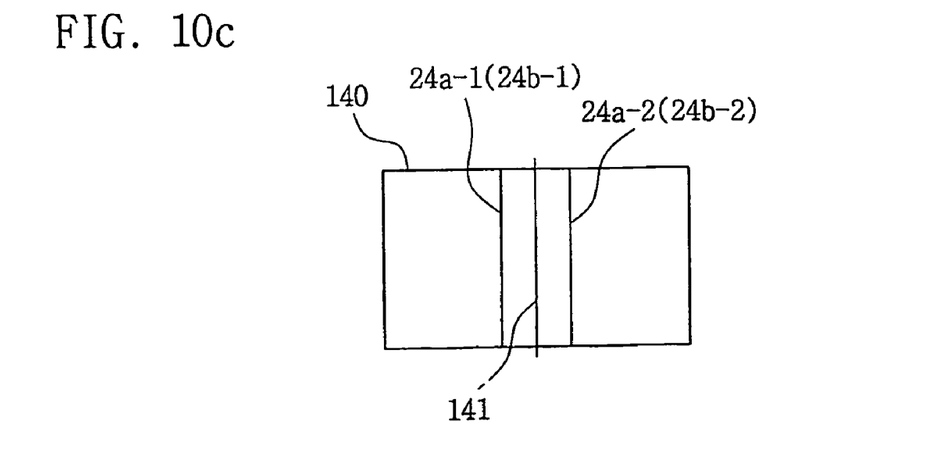

When it is determined that the central line of the left and right edge lines 24a-1 and 24a-2 does not overlap the standard line 141 of the image array coordinate system 140, the computer 120 causes the servomotor 71 to actuate and the input shaft 20 to be stepwise rotated by a predetermined angle, e.g. 1 degree, in response to the output of the control signals, as shown in FIG. 10c. Through the repetitive execution of steps S214 to S220, the central line of the left and right edge lines 24a-1 and 24a-2 is caused to overlap with the standard line 141 of the image array coordinate system 140. It is determined in the preferred embodiment of the present invention that the central line of the left and right edge lines 24a-1 and 24a-2 has overlapped with the standard line 141 of the image array coordinate system 140 if the former overlaps with the latter within a predetermined error range of 20 µm, for example.

In the meantime, if it is determined that the central line of the first left and right edge lines 24a-1 and 24a-2 overlaps the standard line 141 of the image array coordinate system 140, the computer 120 first calculates distances between the left edge lines 24a-1 and 24b-1 and the right edge lines 24a-2 and 24b-2 of the first and second chamfers 24a and 24b, respectively. Then, the computer 120 calculates and stores a width value of the initial first and second chamfers 24a and 24b based on the calculated distances (S222). The computer 120 calculates the width value of the initial first and second chamfers 24a and 24b and then causes the servomotor 71 to actuate and the input shaft 20 to be stepwise rotated by a predetermined angle, e.g. 45 degrees, in response to the output of the control signals. The first and second cameras 90 and 91 photograph the next first and second chamfers 24a and 24b so as to acquire the image data of the next first and second chamfers 24a and 24b (S224). In the same manner as described above, the computer 120 causes the gray level images of the first and second chamfers 24a and 24b inputted from the first and second cameras 90 and 91 to be binary coded by means of a threshold, through the given program. Then, the computer obtains the left and right contours from the binary images of the first and second chamfers 24a and 24b. Further, through the least square error method, noise is filtered out to obtain the linear equations of the left and right contours for the respective first and second chamfers 24a and 24b; left edge lines 24a-1 and 24b-1 and the right edge lines 24a-2 and 24b-2 are then obtained. Thereafter, the distances between the left edge lines 24a-1 and 24b-1 and the right edge lines 24a-2 and 24b-2 of the first and second chamfers 24a and 24b are calculated, and the width value of the next first and second chamfers 24a and 24b is then calculated and stored (S226).

Next, the computer 120 determines whether the width values of the first and second chamfers 24a and 24b have been obtained a predetermined number of times (S228). In the preferred embodiment of the present invention, the respective eight values are obtained as width values of the first and second chamfers 24a and 24b. If it is determined that the width values of first and second chamfers 24a and 24b have not yet been obtained eight times, it goes into step S224 and the computer 120 subsequently calculates the width values of the remaining first and second chamfers 24a and 24b. Thus, the width values of all the first and second chamfers 24a and 24b can be calculated through the execution of the above steps.

The computer 120 calculates width values of the slots 22 using the width values of the first and second chamfers 24a and 24b and given calculation formula (S230), and also calculates total width values obtained by adding the width values of the slots 22 and the width values of the first and second chamfers 24a and 24b (S232). The computer 120 determines whether the input shafts are superior or inferior based on the calculated width values of the slots 22, the total width values, and the width values of the first and second chamfers 24a and 24b (S234). To this end, it is determined whether the machining precision of the slots 22 and the chamfers 24 is within an allowable and predetermined error range. As a result, the input shafts satisfying the precision requirement are classified as superior, whereas the remaining input shafts are classified as inferior (S234). Although the method for inspecting whether the input shafts are superior or inferior based on the calculated widths of the slots 22 and the chamfers 24 has been described above, the inspection whether the input shafts are superior or inferior may be accomplished based only on the machining precision of the chamfers 24 as well.

Finally, when the air cylinder 82 of the tailstock 80 is actuated to move back the cylinder rod 82a after the classification of the input shafts 20 has been completed, the lifter 83 moves linearly and is raised by means of the linear motion guide 84. The robot unloads, from the inspecting position P2, the superior input shafts 20 onto a superior goods conveying line (S236) and the inferior input shafts 20 onto an inferior goods conveying line (S238). The robot loads the following input shaft 20 into the inspecting position P2 and then causes the process of inspecting an input shaft to be repeated.

The above description has been merely used to explain the preferred embodiment of the present invention, and the scope of the present invention is not limited to the preferred embodiment described herein. It is apparent to those skilled in the art that various changes, modifications and substitutions thereto can be made within the technical spirit and the scope of the present invention defined by the appended claims. It should be understood that such a preferred embodiment falls within the scope of the present invention.

INDUSTRIAL APPLICABILITY

According to a machine and method for inspecting an input shaft for use in a power steering system of the present invention described above, the machining precision of the input shafts having a plurality of slots and first and second chamfers formed at the left and right ends of the slots can be accurately inspected by causing the first and second cameras to photograph the input shaft and processing the obtained image data through a computer program. Further, a series of inspection processes such as the feeding, cleaning and classification of the input shafts can be automated. Thus, a total inspection for input shafts can be rapidly and correctly made. Furthermore, there is an advantage in that inspection data for input shafts can be processed and managed in real time.

The invention claimed is:

1. A method of inspecting an input shaft for use in a power steering system, said method comprising the steps of:
providing said input shaft which has a plurality of slots formed at equal intervals in a circumferential direction thereof and first and second chamfers formed at left and right sides of the slots;
cleaning foreign substances adhering to the input shaft at a cleaning position;
loading the input shaft from the cleaning position into an inspecting position;
causing first and second cameras to photograph the first chamfer in an initial slot and the second chamfer in another slot of the input shaft, which is loaded at the inspecting position, in a direction normal to each of the first and second chamfers to acquire image data of the first and second chamfers, respectively;

processing the respective image data of the first and second cameras by means of a computer program and overlapping a central line between left and right edge lines of the first or second chamfer with a standard line of an image array coordinate system;

calculating distances between the left and right edge lines of the first and second chamfers in an overlapped state and then calculating width values of the first and second chamfers;

calculating width values of all remaining first and second chamfers while stepwise rotating the input shaft repeatedly by a predetermined angle; and determining whether the input shaft is superior or inferior based on the calculated width values of the first and second chamfers.

2. The method as claimed in claim 1, wherein left and right contours are obtained from binary images obtained by causing gray level images to be binary coded by means of a threshold, and the left and right edge lines of the first and second chamfers are then calculated from linear equations of the left and right contours.

3. The method as claimed in claim 1, further comprising the step of calculating width values of the slots based on the distances between the left and right edge lines of the first and second chamfers.

* * * * *